United States Patent [19]

Fulmer

[11] Patent Number: 4,693,276

[45] Date of Patent: Sep. 15, 1987

[54] PRESSURE-BALANCED SEALS FOR VENTED ACCUMULATORS

[75] Inventor: Keith H. Fulmer, Mishawaka, Ind.

[73] Assignee: Allied Corporation, Morristown, N.J.

[21] Appl. No.: 906,067

[22] Filed: Sep. 11, 1986

Related U.S. Application Data

[62] Division of Ser. No. 857,901, Apr. 29, 1986, Pat. No. 4,651,782.

[51] Int. Cl.[4] ............................................. F16L 55/04

[52] U.S. Cl. ....................................... 138/31; 92/182; 92/193

[58] Field of Search ...................... 138/26, 31; 92/182, 92/247, 249; 137/207; 220/3; 417/540

[56] References Cited

U.S. PATENT DOCUMENTS

| | | | |
|---|---|---|---|
| 2,417,873 | 5/1947 | Huber | 138/31 X |
| 2,468,980 | 5/1949 | Huber | 92/182 |
| 2,734,531 | 2/1956 | Bizak | 138/31 |

FOREIGN PATENT DOCUMENTS

| | | | |
|---|---|---|---|
| 561694 | 9/1932 | Fed. Rep. of Germany | 138/31 |
| 944514 | 12/1963 | United Kingdom | 138/31 |

*Primary Examiner*—Stephen Marcus

*Assistant Examiner*—Leo Peters

*Attorney, Agent, or Firm*—Larry J. Palguta; Ken C. Decker

[57] ABSTRACT

The pressure accumulator (10) comprises a cylindrical housing (12) having a bore (14) with a piston received slidably therein. The piston (30) has an H-shaped cross section and includes a reduced diameter portion (34) extending longitudinally along the piston (30), and a sealing device (36, 38) disposed at each end of the reduced diameter portion (34). A cylindrical sleeve (44) is received in the reduced diameter portion (34) such that each end of the sleeve (44) abuts a respective sealing device (36, 38). The housing (12) has an exterior circumferential groove (20) with an O-ring (26) therein, and a radial opening (22) extending between the circumferential groove (20) and bore (14). Alternatively, the piston (30) may have a longitudinal opening (61) extending from one side of the piston to grooves (63, 64) at the other end (32), the grooves (63, 64) receiving a ring (72) which is subjected to fluid pressure transmitted through the longitudinal opening (61) and expanded radially outwardly against an angled portion (73) of a force-transmitting member (74) which moves longitudinally against seals (76, 77) disposed in one of the grooves (63, 64).

5 Claims, 3 Drawing Figures

PRESSURE-BALANCED SEALS FOR VENTED ACCUMULATORS

This is a division of application Ser. No. 857,901 filed Apr. 29, 1986 now U.S. Pat. No. 4,651,782.

The present invention relates to pressure accumulators having seals disposed about the piston, with the seals being pressure balanced in order to prevent the intermixing of pressurized fluids disposed at each end of the piston.

Many different types of accumulators are known in which a slidable piston is employed to separate a gaseous fluid on one side of the piston from a liquid fluid on the other side. The gaseous fluid is under high pressure and constantly exerts a force on one side of the piston which, in turn, tends to expel under pressure the liquid fluid disposed on the opposite side of the piston. Such a piston is conventionally provided with a number of O-rings whose primary purpose is to preclude the entry of liquid into the gas chamber or to prevent the entry of gaseous fluid into the liquid fluid chamber. Such types of accumulators typically experience a problem when the gas under pressure leaks by the seals on the perimeter of the piston and enters the hydraulic fluid, which causes the hydraulic fluid to provide a spongy feel to the brake system of an automotive vehicle. In order to improve the sealing effect produced by the seals at the periphery of the piston, numerous constructions have been provided by the prior art. British Patent Specification No. 711,107 illustrates a large piston having a small stepped or differential area piston located at the interior of the large piston so that as fluid pressure is exerted on the differential area piston, it transmits the fluid pressure to the periphery of the large piston. Erle et al. U.S. Pat. No. 3,153,428 illustrates a piston having a pair of packing elements disposed at right angles and biased radially outwardly by a spring-loaded expander having a ramped surface. To allow the escape of gas trapped in the region between the packing elements, the piston has a radial opening communicating with a longitudinal opening having a relief valve so that the gas may be vented to a chamber on one side of the piston.

It is desirable to provide a simple, economical, and highly efficient mechanism for preventing the leakage of fluid from one side of the piston to the other side so that there is effectively precluded any intermixing of the fluids on the respective sides of the piston.

The present invention comprises a pressure accumulator having a housing with a bore extending therein, a piston received slidably in said bore and dividing the bore into first and second chambers, first and second fluids disposed in the respective chambers, the bore communicating with atmospheric pressure by means of a radial opening, characterized in that the piston has a reduced diameter portion extending between first and second ends of the piston, first and second seal means disposed in the reduced diameter portion and adjacent respective ends of the piston, a cylindrical sleeve disposed in the reduced diameter portion and abutting at each cylindrical end thereof respective seal means, the cylindrical sleeve and seal means preventing intermixing of the first and second fluids by means of one of the seal means transferring a high fluid pressure exerted thereon from an associated chamber to the sleeve and to the other seal means to cause radial expansion of the other seal means so that each seal means is subjected to the high fluid pressure. Alternatively, the pressure accumulator may comprise a housing having a radial opening providing communication between atmospheric pressure and a bore extending longitudinally within said housing, a piston having first and second piston ends disposed slidably within the bore and dividing the bore into respective first and second chambers, first and second fluids within the respective chambers, characterized in that the first piston end has a circumferential groove disposed at a radially outer portion thereof, the circumferential groove having a plurality of sealing devices disposed therein, and a longitudinal piston opening extending longitudinally from one side of said piston to said circumferential groove in order to provide communication between the second fluid in the second chamber and the sealing devices, the sealing devices comprising a ring exposed to fluid pressure transmitted from the second chamber to the circumferential groove, an annular force-transmitting member having an angled portion engaged by the ring, and seal means disposed in the longitudinal groove and engaging a radially extending side of said force-transmitting member and a surface of the bore, so that the fluid pressure transmitted through the longitudinal piston opening to the ring member biases radially outwardly, relative to the accumulator, the ring against the angled portion and causes longitudinal movement of the force-transmitting member against said seal means to increase sealing effected by the seal means between the first piston end and surface of the bore.

The invention is described in detail below with reference to the drawings which illustrate embodiments of the invention, in which.

Figure 1:
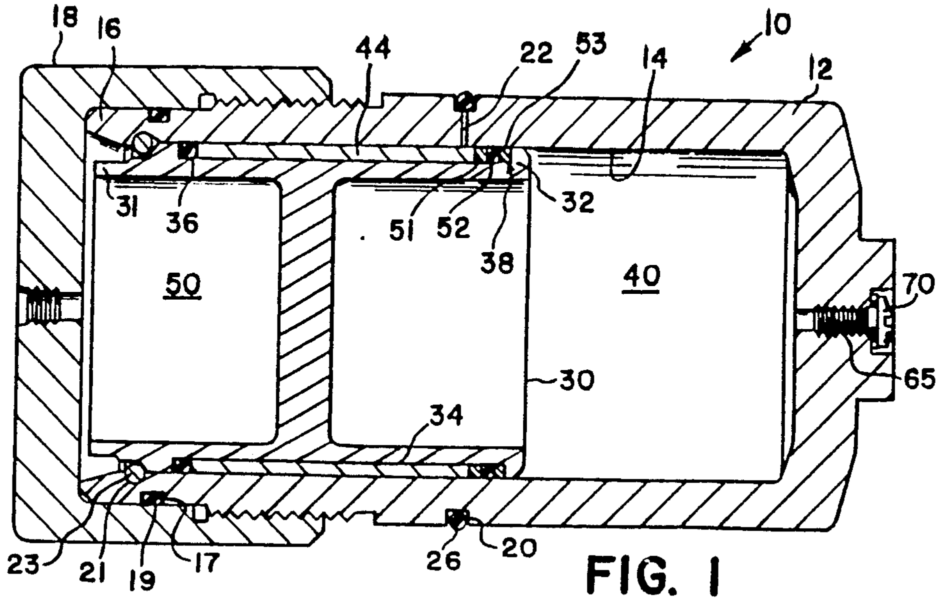
FIG. 1 is a cross-section view of a pressure accumulator having a sleeve disposed about the piston.

A pressure accumulator is designated generally by reference numeral 10 in FIG. 1. Accumulator 10 comprises a cylindrical housing 12 having therein a longitudinal bore 14. End 16 of housing 12 is open and covered by threaded cap or cover 18. A circumferential groove 20 is disposed about the exterior of housing 12, and includes a radial opening 22 providing communication between circumferential groove 20 and bore 14. An O-ring seal 26 is disposed within circumferential groove 20 to prevent the entry of contaminants but permit communication with the atmosphere. A piston 30 is slidably disposed within bore 14 to divide the bore into chambers 40 and 50. The piston 30 has a H-shaped cross section with recessed areas which form portions of the respective bores 40, 50. The housing end 16 has a circumferential groove 17 receiving therein an O-ring 19 to provide a seal between the cover 18 and end 16, and end 16 has an interior groove 21 receiving ring 23 to provide a stop between piston end 31 and cover 18. Between piston ends 31 and 32 is located a reduced diameter portion 34 which has sealing means 36 and 38 at the respective ends. A sleeve 44 is received within the reduced diameter portion 34 and extends longitudinally so that each sleeve end engages the respective sealing means. Sealing means 38 comprises the combination of three seals 51, 52, and 53.

When utilized in an automotive application, accumulator 10 has a gas, typically nitrogen under pressure, within chamber 40 and hydraulic fluid within chamber 50. The screw 70 located within opening 65 is removed and nitrogen under pressure is introduced into chamber 40. In prior art constructions, typically the nitrogen under pressure in the first chamber can, after a period of use, leak past the seals at the respective end of the piston and escape into the hydraulic fluid in the chamber on the opposite side of the piston. The presence of nitrogen within the hydraulic fluid provides a spongy feel to the brake pedal when the brake system of the vehicle is operated. The present invention precludes the intermixing of the fluids disposed within the respective chambers by effecting a pressure balance between the sealing means 36 and 38 disposed at the ends of the piston. Fluid pressure from chamber 50 effects a longitudinal force upon seal 36, and likewise pressure from chamber 40 effects a longitudinal force upon the seals 51, 52, and 53. The pressures on the respective seals may be transmitted, depending on which pressure is higher, via cylindrical sleeve 44 to the sealing means at the opposite end of the piston, so that each sealing means is exposed to approximately the same pressure. The longitudinal forces exerted on the sealing means causes them to expand radially outwardly and engage more tightly the surface of bore 14. Thus, by effecting the transmission of fluid pressure so that the seals at each end of the piston are subjected to the same pressure, i.e., the higher pressure from one of the two chambers, each set of seals is biased radially outwardly with approximately the same force to prevent the higher pressure fluid from escaping into the chamber with the lower pressure fluid.

Figure 2:
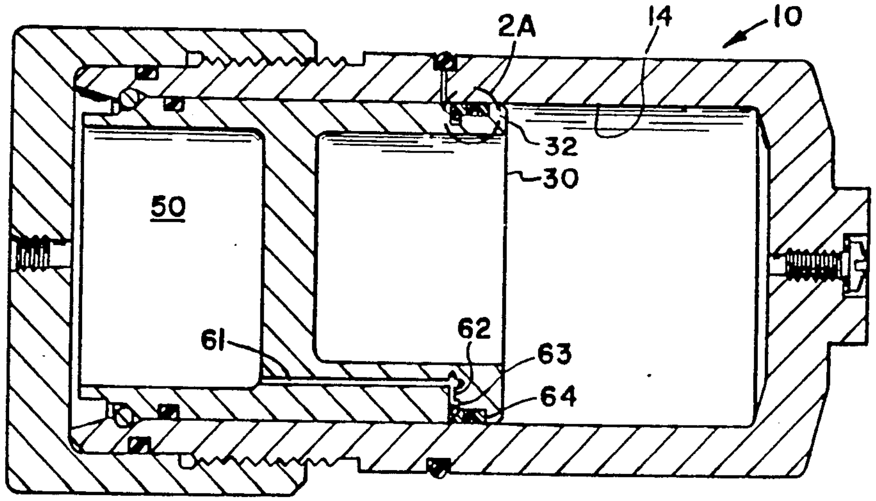
FIG. 2 is a cross-section view of a pressure accumulator utilizing pressure from one chamber to increase the sealing effect of seals at the other end of the piston.
Figure 2A:
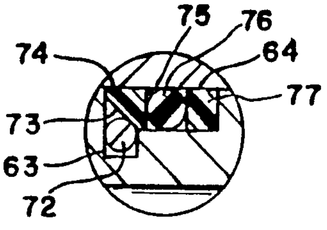
FIG. 2A is an enlarged illustration of a portion of FIG. 2.

FIG. 2 illustrates a second embodiment of the present invention. The same structure is designated by the same reference numerals utilized in FIG. 1. The piston 30 includes a longitudinal opening 61 extending from one side of the piston to a radial opening 62 at the other end of the piston. Radial opening 62 communicates with first circumferential groove 63 and second circumferential groove 64. Located within first circumferential groove 63 is a ring 72 which engages the ramp or angled portion 73 of force-transmittal member 74 (see FIG. 2A). Force-transmittal member 74 is annular shaped and includes a radial surface 75 engaging O-ring 76 that abuts rectangular annular seal 77. In order to improve the seal effected between seal 76 and the surface of bore 14, the pressure of the hydraulic fluid in chamber 50 is transmitted via openings 61 and 62 to ring 72 to bias ring 72 radially outwardly against the angled portion 73. The radially outward movement or displacement of ring 72 against ramp 73 causes force-transmittal member 74 to move longitudinally against seal 76 which causes it to expand radially and effect a tighter seal between end 32 of piston 30 and the surface of bore 14. For both of the embodiments of FIGS. 1 and 2, any gas or fluid which enters the interface between the side of piston 30 and surface of bore 14 may escape through radial opening 22 and circumferential groove 20, and past O-ring 26.

Although the present invention has been illustrated and described in connection with example embodiments, it will be understood that this is illustrative of the invention, and is by no means restrictive, thereof. It is reasonably to be expected that those skilled in the art can make numerous revisions and additions to the invention and it is intended that such revisions and additions will be included in the scope of the following claims as equivalents of the invention.

I claim:

1. A pressure accumulator, comprising a housing having a radial opening providing communication between atmospheric pressure and a bore extending longitudinally within said housing, a piston having first and second piston ends disposed slidably within the bore and dividing the bore into respective first and second chambers, first and second fluids within the respective chambers, characterized in that the first piston end has a circumferential groove disposed at a radially outer portion thereof, the circumferential groove having a plurality of sealing devices disposed therein, and a longitudinal piston opening extending longitudinally from one side of said piston to said circumferential groove in order to provide communication between the second fluid in the second chamber and the sealing devices, the sealing devices comprising a ring exposed to fluid pressure transmitted from the second chamber to the circumferential groove, an annular force-transmitting member having an angled portion engaged by the ring, and seal means disposed in the longitudinal groove and engaging a radially extending side of said force-transmitting member and a surface of the bore, so that the fluid pressure transmitted through the longitudinal piston opening to the ring member biases radially outwardly, relative to the accumulator, the ring against the angled portion and causes longitudinal movement of the force-transmitting member against said seal means to increase sealing effected by the seal means between the first piston end and surface of the bore.

2. The pressure accumulator in accordance with claim 2, further comprising an exterior circumferential housing groove communicating with the radial opening and including an O-ring disposed therein.

3. The pressure accumulator in accordance with claim 2, wherein the piston comprises an H-shaped cross section having recessed areas forming portions of the respective chambers.

4. The pressure accumulator in accordance with claim 3, wherein the seal means comprises an O-ring and a rectangular-shaped circular ring so that when biased longitudinally by the force-transmitting member the O-ring expands radially outwardly to improve the sealing effected between the piston and surface of the bore.

5. The pressure accumulator in accordance with claim 4, wherein the second piston end includes a circumferential groove receiving a seal therein to provide sealing between the second piston end and the surface of the bore.

* * * * *